United States Patent
Hirchenhein et al.

(10) Patent No.: US 10,781,748 B2
(45) Date of Patent: Sep. 22, 2020

(54) METHOD FOR DIAGNOSING ERRORS IN AN INTERNAL COMBUSTION ENGINE

(71) Applicant: Robert Bosch GmbH, Stuttgart (DE)

(72) Inventors: Achim Hirchenhein, Bietigheim-Bissingen (DE); Alexander Schenck Zu Schweinsberg, Moeglingen (DE); Klaus Joos, Walheim (DE)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 16/300,333

(22) PCT Filed: Apr. 20, 2017

(86) PCT No.: PCT/EP2017/059352
§ 371 (c)(1),
(2) Date: Nov. 9, 2018

(87) PCT Pub. No.: WO2017/194283
PCT Pub. Date: Nov. 16, 2017

(65) Prior Publication Data
US 2019/0145313 A1    May 16, 2019

(30) Foreign Application Priority Data
May 12, 2016    (DE) .................. 10 2016 208 195

(51) Int. Cl.
*F02B 77/08*    (2006.01)
*F02D 41/22*    (2006.01)
(Continued)

(52) U.S. Cl.
CPC ........ *F02B 77/083* (2013.01); *F02D 41/1497* (2013.01); *F02D 41/22* (2013.01);
(Continued)

(58) Field of Classification Search
CPC ........ F02B 77/08; F02B 77/083; F02D 41/14; F02D 41/1497; F02D 41/22;
(Continued)

(56) References Cited

U.S. PATENT DOCUMENTS 5,299,550 A * 4/1994 Inoue .................. F02D 41/22
                                                    123/674
5,445,019 A    8/1995 Glidewell et al.
(Continued)

FOREIGN PATENT DOCUMENTS

DE    4035958 A1    5/1992
DE    10339251 A1    3/2005
(Continued)

OTHER PUBLICATIONS

International Search Report for PCT/EP2017/059352, dated Jul. 4, 2017.

*Primary Examiner* — John Kwon
*Assistant Examiner* — Johnny H Hoang
(74) *Attorney, Agent, or Firm* — Norton Rose Fulbright US LLP; Gerard Messina

(57) ABSTRACT

A method is described for diagnosing errors in an internal combustion engine in which fuel is injected from a high-pressure accumulator into associated combustion chambers with the aid of multiple fuel injectors, a first value ($R_{stat,2}$) which is representative of a static flow rate of fuel through one of the fuel injectors being ascertained, a second value ($\Delta n$) which is representative of a running smoothness of the internal combustion engine being ascertained, if at least one of the two values ($R_{stat,2}$, $\Delta n$) deviates from the particular associated reference value ($R'_{stat}$, $\Delta n_0$), an error (F) being deduced, and the error (F) being assigned to the fuel injector and/or at least one further component and/or at least one operating phase of the internal combustion engine on the basis of deviations of the two representative values ($R_{stat,2}$, (Continued)

Δn) from the particular associated reference value ($R'_{stat}$, $\Delta n_0$).

14 Claims, 3 Drawing Sheets

(51) Int. Cl.
    *F02D 41/24*     (2006.01)
    *F02D 41/14*     (2006.01)
    *G01M 15/04*     (2006.01)
    *G01M 15/06*     (2006.01)
    *G01M 15/11*     (2006.01)
    *F02D 41/00*     (2006.01)

(52) U.S. Cl.
    CPC ....... *F02D 41/221* (2013.01); *F02D 41/2467* (2013.01); *G01M 15/042* (2013.01); *G01M 15/06* (2013.01); *G01M 15/11* (2013.01); *F02D 41/0085* (2013.01); *F02D 2200/0602* (2013.01); *F02D 2200/0614* (2013.01); *F02D 2200/0616* (2013.01); *F02D 2200/101* (2013.01); *Y02T 10/40* (2013.01)

(58) Field of Classification Search
    CPC .... F02D 41/221; F02D 41/24; F02D 41/2467; G01M 15/04; G01M 15/042; G01M 15/06; G01M 15/11
    USPC .................. 701/102, 110, 111, 114, 115
    See application file for complete search history.

(56) References Cited

U.S. PATENT DOCUMENTS

| | | |
|---|---|---|
| 2007/0250288 A1 | 10/2007 | Maier-Landgrebe |
| 2008/0059039 A1* | 3/2008 | Nakagawa .......... F02D 41/2464 701/99 |
| 2011/0030655 A1* | 2/2011 | Kaneko ................... F02D 41/22 123/456 |
| 2011/0302999 A1 | 12/2011 | Porten et al. |
| 2012/0150417 A1 | 6/2012 | Massaro |
| 2018/0223761 A1* | 8/2018 | Hirchenhein ....... F02D 41/3809 |

FOREIGN PATENT DOCUMENTS

| | | |
|---|---|---|
| DE | 102009002593 A1 | 10/2010 |
| DE | 102010051035 A1 | 5/2012 |
| DE | 102014007963 A1 | 12/2015 |
| DE | 102015205877 A1 | 10/2016 |
| EP | 2284378 A2 | 2/2011 |

* cited by examiner

METHOD FOR DIAGNOSING ERRORS IN AN INTERNAL COMBUSTION ENGINE

FIELD OF THE INVENTION

The present invention relates to a method for diagnosing errors in an internal combustion engine as well as a processing unit and a computer program for carrying out same.

BACKGROUND INFORMATION

In motor vehicles, very strict limiting values must be adhered to in some cases with regard to emissions of harmful agents which are to be complied with. To comply with instantaneous and, in particular, also future emission or exhaust gas limiting values, accurate fuel metering during the injection is crucial, among other things.

In this case, it is to be taken into account, however, that various tolerances occur during the metering. Such metering tolerances generally result from the type-specific needle dynamic and the type-specific static flow rate of the fuel injectors. The effect of the needle dynamic may be for example reduced by a mechatronic approach, for example a so-called controlled valve operation (CVO).

In the case of a CVO, the activation times of the fuel injectors are adapted in the sense of a control, for example throughout the lifetime of a motor vehicle. Here, the activation signal is detected during the injection and the open duration of the valve needle is ascertained in parallel from the opening and closing points in time. Thus, the actual open duration of each injector may be computed and, if needed, readjusted. In DE 10 2009 002 593 A1, such a method for controlling an actual open duration of a valve to a setpoint open duration is described.

Potential errors in the static flow rate result from tolerances of the injection hole geometry and the needle lift. The injection hole geometry is often optimized with regard to good emission values, whereby a sensitivity for coking may increase, however. Until now, it is only possible in most cases to correct such errors globally, i.e. with regard to all fuel injectors of the internal combustion engine together, for example on the basis of a lambda control or mixture adaptation. It is, however, not possible to detect whether individual fuel injectors of the internal combustion engine deviate with regard to their static flow rate (i.e. deliver different quantities during the same open duration), which may be exhaust-relevant or running smoothness-relevant.

A method is known from German Application No. 10 2015 205 877 (unplublished), for example, for ascertaining a static flow rate of a fuel injector or a value which is representative thereof.

SUMMARY

According to the present invention, a method for diagnosing errors in an internal combustion engine as well as a processing unit and a computer program for carrying out same having the features of the independent patent claims are provided. Advantageous embodiments are the subject matter of the subclaims as well as of the following description.

A method according to the present invention is used to diagnose errors in an internal combustion engine in which fuel is injected from a high-pressure accumulator into associated combustion chambers with the aid of multiple fuel injectors. Here, a first value which is representative of a static flow rate of fuel through one of the fuel injectors and a second value, for example a rotational speed fluctuation, which is representative of a running smoothness of the internal combustion engine are ascertained. If at least one of the two representative values deviates from a reference value associated in each case, an error is deduced and the error is assigned to the fuel injector and/or at least one further component and/or at least one operating phase of the internal combustion engine on the basis of the deviations of the two representative values from the reference value associated in each case. The reference values may be repeated, for example, or continuously updated. It may also be advantageous in this case to carry out this method for each one of the fuel injectors of the internal combustion engine. It may also be advantageous that a deviation is only considered as detected as a deviation if the deviation exceeds a certain threshold in order to avoid possible errors which are detected erroneously due to measuring tolerances.

With the aid of the methods of the CVO mentioned at the outset and for ascertaining the static flow rate of a fuel injector, it is possible to detect and reduce metering errors depending on the fuel injectors. However, the provided method now moreover makes it possible to further assign an error not only to the fuel injectors, but also, if applicable, to further components of the internal combustion engine and/or operating phases of the internal combustion engine. The at least one further component of the internal combustion engine may in particular include an air supply system and/or an ignition device of the internal combustion engine. The at least one operating phase of the internal combustion engine may include a compression of the air/fuel mixture and/or an ignition process in the internal combustion engine. In the case of all these components or operating phases, just as in the case of the needle lift dynamic, the tolerances of the injection hole geometry, and the needle lift of the fuel injectors, disturbances may occur which may have an effect on the operation of the internal combustion engine. The present invention now makes use of the fact that deviations in the fuel injectors and disturbances of the other components or operating phases have a different effect on the static flow rate of the individual fuel injectors and the running smoothness of the internal combustion engine. This makes a further differentiation or assignment of errors possible, thus allowing for a more effective troubleshooting.

If only the first value deviates from the associated reference value, the error is preferably assigned to the fuel injector. In this case, it may be assumed that the error is attributable solely to the fuel injector, since a deviation of the static flow rate or a value representative thereof may only be based on possible disturbances or contaminations of the fuel injector. It may then be advantageous to characterize the fuel injector as degraded or defective and to provide for a replacement, for example within the scope of a later repair shop visit.

Advantageously, if only the second value deviates from the associated reference value, the error is assigned to the at least one further component and/or the at least one operating phase of the internal combustion engine. In this case, it may be assumed that the error is not attributable to the fuel injector, since a disturbance or a contamination of the fuel injector would in general also entail a deviation of the static flow rate or of a value representative thereof. It may then be advantageous to store an indication or entry or the like in an error memory in order to provide for or display a replacement or a repair of the appropriate component or a check of the settings of the appropriate operating phase, for example within the scope of a later repair shop visit.

If both values deviate from their associated reference values, the error is preferably assigned to the fuel injector, on the one hand, and to at least one further component and/or at least one further operating phase of the internal combustion engine, on the other hand. In this case, it may be assumed that the error is attributable to the fuel injector as well as to a further component or operating phase, since a disturbance or a contamination of the fuel injector in general entails a deviation of the static flow rate or of a value representative thereof, but in general has no influence on the running smoothness of the internal combustion engine. It may then be advantageous to store an indication or entry or the like in an error memory in order to provide for or display a replacement or a repair of the appropriate component or a check of the settings of the appropriate operating phase, for example within the scope of a later repair shop visit. In addition, it may for example be provided to preventively clean all fuel injectors.

If the error is assigned to the at least one further component and/or to the at least one operating phase of the internal combustion engine, a more detailed assignment of the error is advantageously carried out taking into account a lambda control. By evaluating a lambda value or a control of the lambda value, it may be detected, for example, whether a combustion is fed more or less air than desirable or, for example, whether the ignition timing is not followed as desirable. In this way, an even more detailed assignment of the error is thus made possible in a very simple manner.

It is advantageous if a piece of information about the error is stored in an error memory if at least one of the two values deviates from its associated reference value by more than an associated first threshold value. Here, 10% of the associated reference value may be used as the particular first threshold value, for example. In the case of such a deviation, a functional restriction of the internal combustion engine is in general not yet safety-critical, but should be remedied during the next repair shop visit. On these grounds, the storage of the information may include an entry in an error memory. This makes possible a simple instruction for exchanging the fuel injector or a further component or a check. These particular first threshold values may be used in this case as those (already mentioned) threshold values in the case of whose exceedance a deviation of one of the values from the associated reference value is considered as detected.

A driver of a motor vehicle, which includes the internal combustion engine, advantageously receives a warning if at least one of the two values deviates by more than an associated second threshold value, which is greater than the particular first threshold value, from its associated reference value. Here, 25% of the particular reference value may be used as the particular second threshold value, for example. In the case of such a deviation, a functional restriction is potentially already safety-critical and a repair shop visit or at least a minimum-load driving behavior should take place as soon as possible. On these grounds, the warning may for example include the flashing of a warning light (for example a malfunction indicator light (MM)) and/or a message on a display in the motor vehicle. In this way, a safety-critical situation may be easily avoided.

It is also advantageous if a profile of deviations of the first and/or second value from the particular reference value(s) is detected and stored over a mileage of the internal combustion engine. The storage may take place in a memory in an executing control unit, for example. In this way, the data may be made available to a repair shop very easily. In particular, a targeted exchange of a defective fuel injector is thus possible, for example. In addition, these field data may be stored and evaluated later, for example. This makes it possible to detect a necessity of adding a cleaning additive, for example, if a contamination or a coking of the fuel injector is frequently observed, for example. Furthermore, it is possible, for example, to deduce a general manufacturing problem, a property of the fuel injector design, caused by critical usage conditions (temperature, medium, or the like), or an installation position effect (for example at the cylinder head) and respond thereto in a timely manner. The same applies to the air supply system, for example with regard to a suspicion about a blocked air filter due to dirt in the air drawn in (sand, dust, or the like) or a leakage, for example due to a porous air tube.

A first reference value which is associated with the first value is preferably ascertained taking into account corresponding first values of all or of all other fuel injectors of the internal combustion engine, in particular as a mean value. This allows for a particularly effective comparison with the other fuel injectors. In particular, this process does not require the actual flow rate to be ascertained, since only the particular representative values are used, which is sufficient for a relative comparison, i.e. to ascertain whether the flow rate of one fuel injector potentially deviates from that of the other fuel injectors. In particular, potential systematic measuring errors are negligible in this way. If the conversion values for converting the representative value into the associated flow rate are known, it is also conceivable, however, to directly use the flow rate as the representative value. In this case, the conversion values include, for example, sufficiently accurate information about the fuel type, in particular the ethanol content, a fuel temperature, and a pressure in the high-pressure accumulator, the so-called rail pressure. In particular, it may be useful that a deviation of the flow rate or the representative value for each fuel injector is generally different.

Prior to ascertaining the two values, deviations of the static flow rates and/or deviations of the open durations during injection processes are advantageously reduced, in particular minimized, in each case among the different fuel injectors of the internal combustion engine. This may take place, for example, according to the methods of the CVO mentioned at the outset and for ascertaining the static flow rate of a fuel injector. In this way, the error assignment carried out in the provided method may take place even more accurately.

The first value may be ascertained, for example, by ascertaining a ratio of a pressure difference occurring in the high-pressure accumulator due to the injection process and of an associated duration, which is characteristic for the injection process, in the case of at least one injection process of the fuel injector. Here, it may be useful that the fuel quantity delivered by a fuel injector during an injection process or the volume thereof is proportional or at least sufficiently proportional to the associated pressure difference, i.e. the pressure difference prior to and after the injection process, in the high-pressure accumulator. Now, if a duration which is characteristic for the injection process is additionally known, the ratio of this pressure difference and the associated duration may be used to ascertain a value which corresponds, except for a proportionality factor, to the static flow rate through the fuel injector. In this way, a value which is representative of the flow rate may be very easily obtained.

A processing unit according to the present invention, e.g., a control unit of a motor vehicle, is designed to carry out a method according to the present invention, in particular from a programming point of view.

It is also advantageous to implement the method in the form of a computer program, since this is particularly cost-effective, in particular when an executing control unit is used for other tasks and is thus present anyway. Suitable data carriers for providing the computer program are, in particular, magnetic, optical, and electrical memories such as hard drives, flash memories, EEPROMs, DVDs, and many others. It is also possible to download a program via computer networks (Internet, Intranet, etc.).

Further advantages and embodiments of the present invention result from the description and the appended drawing.

The present invention is schematically illustrated in the drawing on the basis of an exemplary embodiment and is described below with reference to the drawing.

DETAILED DESCRIPTION

Figure 1:
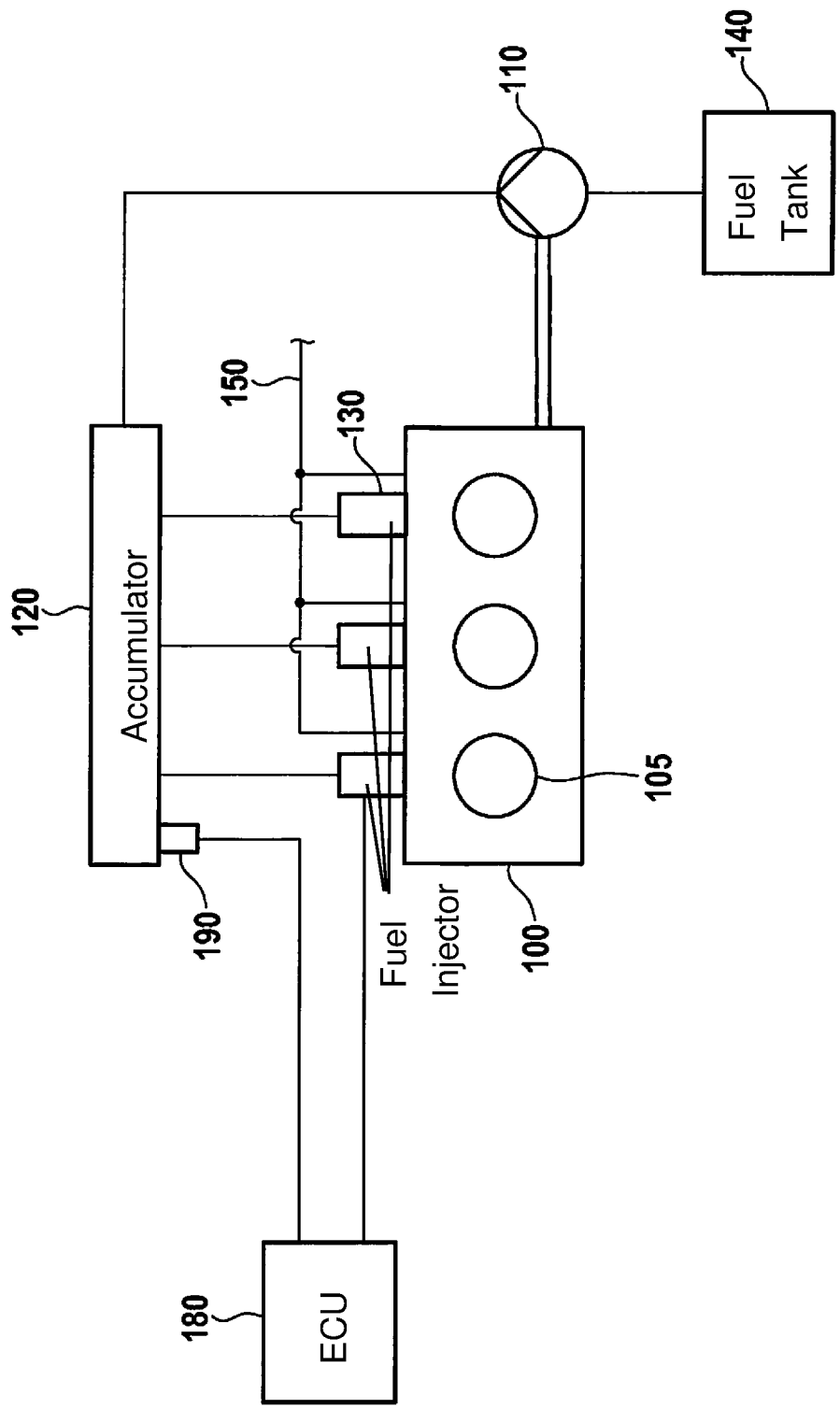
FIG. 1 schematically shows an internal combustion engine including a common-rail system which is suitable for carrying out a method according to the present invention.

FIG. 1 schematically shows an internal combustion engine 100 which is suitable for carrying out a method according to the present invention. Internal combustion engine 100 includes three combustion chambers or associated cylinders 105 by way of example. Each combustion chamber 105 is assigned a fuel injector 130 which, in turn, is connected in each case to a high-pressure accumulator 120, a so-called rail, via which it is supplied with fuel. It is understood that a method according to the present invention may also be carried out in an internal combustion engine including any arbitrary number of cylinders, for example four, six, eight or twelve cylinders.

High-pressure accumulator 120 is further fed with fuel from a fuel tank 140 via a high-pressure pump 110. High-pressure pump 110 is coupled to internal combustion engine 100, namely in such a way, for example, that the high-pressure pump is driven via a crankshaft of the internal combustion engine or via a camshaft which, in turn, is coupled to the crankshaft. Furthermore, an air supply system 150 is shown via which air may be supplied to individual combustion chambers or cylinders 105.

Fuel injectors 130 are activated to meter fuel into particular combustion chambers 105 via a processing unit which is designed as an engine control unit 180. For the sake of clarity, only the connection from engine control unit 180 to one fuel injector 130 is illustrated, it is understood however, that each fuel injector 130 is correspondingly connected to the engine control unit. Each fuel injector 130 may be specifically activated in this case. Furthermore, engine control unit 180 is configured to detect the fuel pressure in high-pressure accumulator 120 with the aid of a pressure sensor 190.

Figure 2:
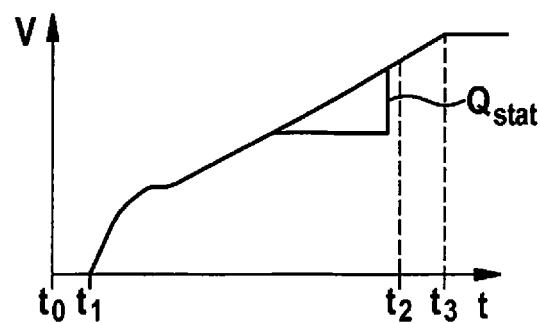
FIG. 2 shows in a diagram a flow volume in a fuel injector over time.

In the diagram of FIG. 2, a cumulative flow volume V through a fuel injector over time t is illustrated in the case of a long-lasting activation of the fuel injector. At point in time $t_0$, an activation time starts and at point in time $t_1$, the valve needle starts to lift. Thus, an open duration of the fuel injector also starts at point in time $t_1$. It is apparent in this case that cumulative flow volume V or the fuel quantity flown through the fuel injector constantly increases across a wide range following a short period of time while the valve needle is lifting. In this range, the valve needle is in a so-called full lift, i.e. the valve needle is lifted completely or up to a setpoint height.

During this time, a constant fuel quantity flows per time unit through the valve opening of the fuel injector, i.e. static flow rate $Q_{stat}$ which indicates the increase in the cumulative flow volume V, is constant. In this case, the magnitude of the static flow rate is a crucial factor which, as already mentioned at the outset, determines the fuel quantity injected overall during an injection process. Deviations or tolerances in the static flow rate therefore affect the injected fuel quantity per injection process.

At point in time $t_2$, the activation time ends and the closing time starts. The valve needle starts to lower itself in the process. The closing time and the open duration end at point in time $t_3$ when the valve needle again completely closes the valve.

Figure 3:
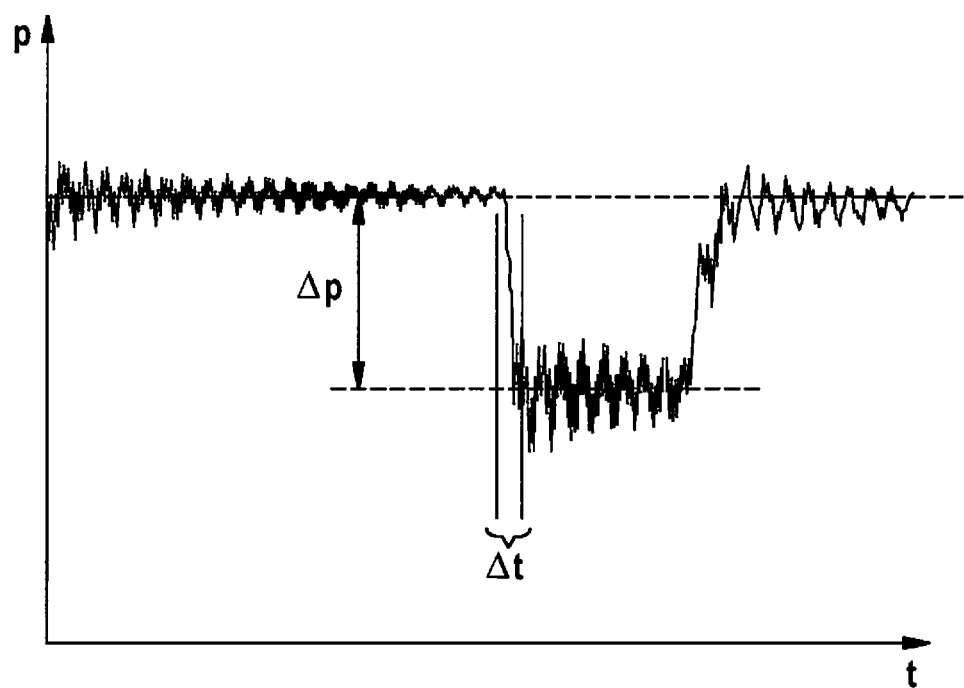
FIG. 3 shows in a diagram a pressure profile in a high-pressure accumulator during an injection process.

In the diagram of FIG. 3, a pressure profile in a high-pressure accumulator during an injection process is illustrated over time t. It is apparent in this case that pressure p is essentially constant in the high-pressure accumulator, apart from certain fluctuations due to pump deliveries. During the injection process, which takes place for a time duration $\Delta t$, pressure p drops in the high-pressure accumulator by a value $\Delta p$.

Subsequently, pressure p remains at the lower level, again apart from certain fluctuations, until pressure p increases again to the starting level as a result of a subsequent delivery by the high-pressure pump.

These pressure drops during injection processes are detected and evaluated with the aid of the usually already present components, for example pressure sensor 190 and engine control unit 180, including the appropriate input circuit. Additional components are therefore not necessary. This evaluation takes place for each combustion chamber 105 individually.

Static flow rate $Q_{stat}$ through the fuel injector is characterized, as already mentioned, by the injected fuel quantity or its volume per time. In a high-pressure accumulator or rail pumped up to the system pressure, the injected volume is proportional to the pressure drop in the rail. The associated time duration corresponds in this case to the open duration of the fuel injector which may be determined mechatronically with the aid of a so-called CVO (see for example DE 10 2009 002 593 A1), for example, as mentioned at the outset.

By forming a quotient between pressure drop or pressure difference $\Delta p$ and open duration or time duration of the injection $\Delta t$, a pressure rate is obtained as a replacement value or a first representative value $R_{stat} = \Delta p / \Delta t$ for static flow rate $Q_{stat}$, i.e. for a measuring operation $$Q_{stat} \Box \frac{\Delta p}{\Delta t}$$

applies. A subsequent delivery by the high-pressure pump should not take place in the relevant time window, in this case. A subsequent delivery is therefore to be suppressed, if necessary.

In order to increase the accuracy of first representative value $R_{stat}$, it is possible, for example, to carry out a mean value formation over multiple such injection processes.

If, for example, a mean value of the individual first representative values of all fuel injectors is used as the first reference value which is associated with the first representative value, a deviation of a fuel injector is ascertained with regard to its first representative value and is reduced or minimized as compared to the first reference value. This may also be carried out for multiple or all fuel injectors.

It is also conceivable that all fuel injectors, except for the one which is to be checked at the time, are used when computing the first reference value.

Figure 4:
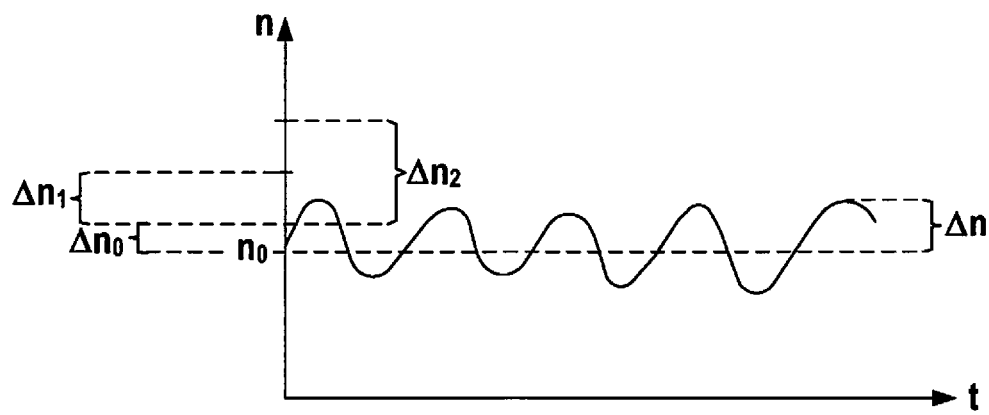
FIG. 4 shows in a diagram a rotational speed profile of the internal combustion engine including rotational speed fluctuations and an associated reference value in a method according to the present invention in one preferred specific embodiment.

In the diagram of FIG. 4, a rotational speed profile of the internal combustion engine is illustrated including rotational speed fluctuations as a second value representative of the running smoothness. For this purpose, rotational speed n is plotted against time t. Rotational speed fluctuation $\Delta n$, here the maximum deviation of rotational speed n as compared to a mean value $n_0$, may be used in this case as a measure for the running smoothness of the internal combustion engine.

As the associated, second reference value, rotational speed fluctuation $\Delta n_0$ may be used, for example. In this case, it should be taken into account that certain rotational speed fluctuations, i.e. deviations of the maximally occurring value from the mean value, generally always occur and therefore a deviation of a rotational speed fluctuation—as defined here—from mean value no cannot already be assumed.

It is advantageous, however, that a deviation of the second representative value from the associated reference value is only considered as detected, if the deviation from associated reference value $\Delta n_0$ is greater than first associated threshold value $\Delta n_1$ (shown in the present case), in order to take into account potential measuring tolerances.

It is, however, also conceivable to use as the second representative value a mean rotational speed, averaged over a certain number, for example one, two, or three, rotations of the internal combustion engine. In this case, mean value no, which should then be ascertained over a considerably higher number of rotations, for example 20 or 30, may be used as the associated second reference value.

First threshold value $\Delta n_1$ as well as second threshold value $\Delta n_2$, which is also shown and belongs to the rotational speed fluctuation, will be elucidated in greater detail below.

Figure 5:
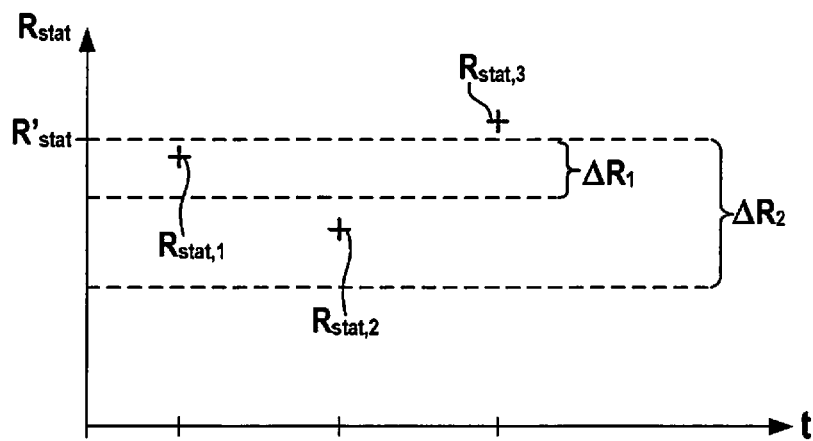
FIG. 5 shows a first value which is representative of a static flow rate and an associated reference value in a method according to the present invention in one preferred specific embodiment.

In the diagram of FIG. 5, three representative values $R_{stat,1}$, $R_{stat,2}$, and $R_{stat,3}$ are shown, such as the ones which may be ascertained for the fuel injectors shown in FIG. 1, for example, according to the method elucidated above.

Furthermore, a first reference value $R'_{stat}$ is shown which is obtained as an arithmetic mean value, for example, from the two representative values $R_{stat,1}$ and $R_{stat,3}$ by way of example. The first reference value is thus ascertained from all other fuel injectors, except for the checked fuel injector. It is also conceivable, however, that the first reference value is ascertained from all three (i.e. all present) fuel injectors, i.e. including the checked fuel injector.

A deviation of the second representative value, $R_{stat,2}$ in this case, from associated reference value $R'_{stat}$ may now be considered as detected, for example, if second representative value $R_{stat,2}$ deviates from reference value $R'_{stat}$ at all. Preferably, a deviation should only be considered as detected, if the deviation is greater than a certain threshold value, in particular also in order to take into account potential measuring tolerances. Here, a first threshold value $\Delta R_1$ may be involved, for example, which belongs to the second representative value.

First threshold value $\Delta R_1$ as well as second threshold value $\Delta R_2$, which is also shown and belongs to the second representative value, shall be elucidated in greater detail below.

Figure 6:
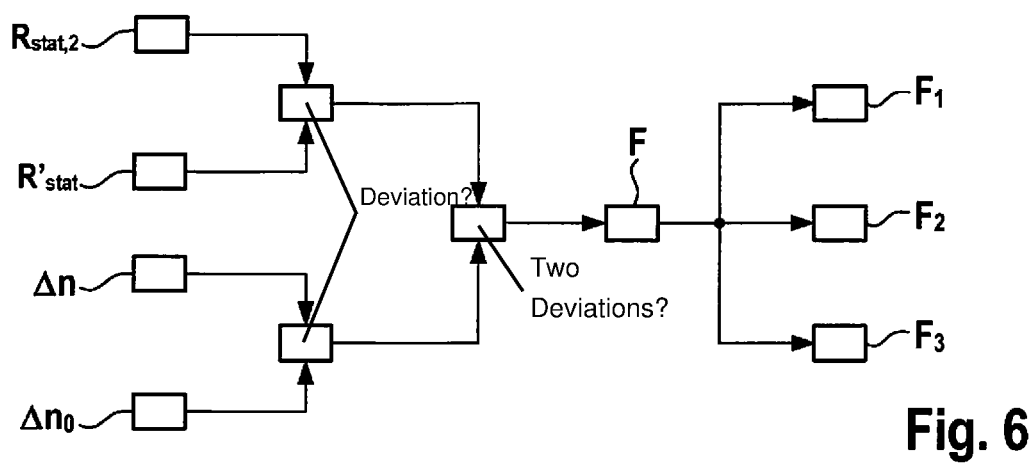
FIG. 6 schematically shows a sequence of a method according to the present invention in one preferred specific embodiment.

FIG. 6 schematically shows a sequence of a method according to the present invention in one preferred specific embodiment. Initially, the deviations of the static flow rates and/or deviations of open durations during injection processes may be reduced, in particular minimized, among different fuel injectors of the internal combustion engine, as was mentioned at the outset with regard to the CVO, for example.

Furthermore, the deviations of the fuel injectors with regard to their first representative values may be ascertained and reduced or minimized as compared to the first reference value, as was also already mentioned, inter alia, with reference to FIG. 3.

Furthermore, first representative value $R_{stat,2}$ may now be checked, as shown, with regard to a deviation from associated, first reference value $R'_{stat}$. For this purpose, the first representative value may be ascertained again after reducing or minimizing the deviation of the first representative value. Furthermore, second representative value $\Delta n$ may now be checked with regard to a deviation from associated, second reference value $\Delta n_0$.

A deviation may be considered as detected if the particular representative value deviates from the particular reference value by more than the particular first threshold value, for example, as was elucidated in greater detail with reference to FIGS. 4 and 5.

If now at least one of the two representative values $R_{stat,2}$ or $\Delta n$ deviates from associated reference values $R'_{stat}$ or $\Delta n_0$, an error F may be deduced.

Depending on whether only one of the two representative values deviates from the associated reference value or whether both representative values deviate from the associated reference values, the error may now be assigned differently.

If only first representative value $R_{stat,2}$ deviates from associated reference value $R'_{stat}$, the error is assigned to the appropriate fuel injector, as is indicated in this case with the aid of reference numeral $F_1$.

If only second representative value $\Delta n$ deviates from associated reference value $\Delta n_0$, the error is assigned to the at least one other component and/or the at least one operating phase of the internal combustion engine, as is indicated in this case with the aid of reference numeral $F_2$.

If both representative values $R_{stat,2}$ and $\Delta n$ deviate from associated reference values $R'_{stat}$ and $\Delta n_0$, respectively, the error is assigned to the fuel injector and the at least one other component and/or the at least one operating phase of the internal combustion engine, as is indicated in this case with the aid of reference numeral $F_3$.

As far as more detailed elucidations with regard to the assignment of the error are concerned, reference is made to the above-mentioned explanations to avoid repetitions.

If the representative value (or, depending on the situation, both) deviate(s) from the associated reference value by more than the particular first threshold value, but by less than the particular second threshold value, as is shown in FIG. 5 for the first representative value, for example, the information about the error may be stored in an error memory, for example.

If, for example, one of the representative values were to deviate from the associated reference value by more than the particular threshold value during a later check, a warning may be output to a driver, for example.

What is claimed is:

1. A method for diagnosing an error in an internal combustion engine in which fuel is injected from a high-pressure accumulator into associated combustion chambers with the aid of multiple fuel injectors, the method comprising:
    ascertaining a first value that represents a static flow rate of fuel through one of the fuel injectors, the ascertaining of the first value including determining a quotient of: (i) a pressure drop in the high-pressure accumulator during a fuel injection by the one of the fuel injectors, and (ii) a time duration of the fuel injection by the one of the fuel injectors;
    ascertaining a second value that represents a running smoothness of the internal combustion engine, the ascertaining of the second value including determining a rotational speed fluctuation of the internal combustion engine, wherein the rotational speed fluctuation of the internal combustion engine is a deviation of a maximally occurring rotational speed of the internal combustion engine from a mean value of the rotational speed of the internal combustion engine;
    comparing the first value to a first reference value;
    comparing the second value to a second reference value;
    based on the comparing of the first value and the comparing of the second value, detecting the error, the error being detected by at least one of: (1) detecting a deviation of the first value from the first reference value, and (2) detecting a deviation of the second value from the second reference value;
    and
    determining the error is attributable to:
        (1) the one of the fuel injectors when the deviation of the first value from the first reference value is detected, and
        (2) at least one further component of the internal combustion engine or at least one operating phase of the internal combustion engine when the deviation of the second value from the second reference value is detected, and
        (3) both (i) the one of the fuel injectors, and (ii) the at least one further component of the internal combustion engine or the at least one operating phase of the internal combustion engine, when both (i) the deviation of the first value from the first reference value is detected and (ii) the deviation of the second value from the second reference value is detected.

2. The method as recited in claim 1, wherein at least one of:
    the at least one further component of the internal combustion engine includes an air supply system of the internal combustion engine or an ignition device of the internal combustion engine; and
    the at least one operating phase of the internal combustion engine includes a compression of an air/fuel mixture in the internal combustion engine or an ignition process in the internal combustion engine.

3. The method as recited in claim 1, further comprising: when the error is determined to be attributable to the at least one further component of the internal combustion engine or the at least one operating phase of the internal combustion engine, carrying out a more detailed diagnosis of the error out under consideration of a lambda control.

4. The method as recited in claim 1, further comprising: storing a piece of information about the error in an error memory when at least one of:
    the first value deviates from the first reference value by more than a first threshold value, and
    the second value deviates from the second reference value by more than the first threshold value.

5. The method as recited in claim 4, wherein the internal combustion engine is included in a motor vehicle, and wherein the method further comprises:
    outputting a warning to a driver of the motor vehicle when (1) the first value deviates from the first reference value by more than a second threshold value, or (2) the second value deviates from the second reference value by more than the second threshold value;
    wherein the warning is output by activating a malfunction indicator light in the motor vehicle or displaying a message in the motor vehicle; and
    wherein the second threshold value is greater than the first threshold value.

6. The method as recited in claim 1, further comprising: detecting and storing a profile of a deviation of at least one of the first value from the first reference value and the second value from the second reference value over a mileage of the internal combustion engine.

7. The method as recited in claim 1, further comprising: ascertaining the first reference value by determining a mean of ascertained respective first values of all fuel injectors of the internal combustion engine except the one of the fuel injectors, wherein each of the first values is ascertained by determining a quotient of: (i) a pressure drop in the high-pressure accumulator during a fuel injection by the respective fuel injector, and (ii) a time duration of the fuel injection by the respective fuel injector.

8. The method as recited in claim 1, further comprising: prior to ascertaining the first value and the second value, reducing at least one of: (i) deviations of the static flow rates, and (ii) deviations of open durations during injection processes, in each case among different fuel injectors of the internal combustion engine.

9. The method as recited in claim 8, wherein the at least one of the deviations of the static flow rates and the deviations of the open durations during the injection processes are reduced by being minimized.

10. A processing unit for diagnosing an error in an internal combustion engine in which fuel is injected from a high-pressure accumulator into associated combustion chambers with the aid of multiple fuel injectors, the processing unit being adapted to:
    ascertain a first value that represents a static flow rate of fuel through one of the fuel injectors, the processing unit being adapted to ascertain the first value by determining a quotient of: (i) a pressure drop in the high-pressure accumulator during a fuel injection by the one of the fuel injectors, and (ii) a time duration of the fuel injection by the one of the fuel injectors;
    ascertain a second value that represents a running smoothness of the internal combustion engine, the processing using being adapted to ascertain the second value by determining a rotational speed fluctuation of the internal combustion engine, wherein the rotational speed fluctuation of the internal combustion engine is a deviation of a maximally occurring rotational speed of the internal combustion engine from a mean value of the rotational speed of the internal combustion engine;

detect the error if: at least one of (1) the first value deviates from a first reference value, and (2) the second value deviates from a second reference value; and if the error is detected, determine the error is attributable to:
(1) the one of the fuel injectors if the first value deviates from the first reference value, and
(2) at least one further component of the internal combustion engine, or at least one operating phase of the internal combustion engine if the second value deviates from the second reference value, and
(3) both (i) the one of the fuel injectors, and (ii) the at least one further component of the internal combustion engine or the at least one operating phase of the internal combustion engine, if both (i) the first value deviates from the first reference value, and (ii) the second value deviates from the second reference value.

11. The processing unit according to claim 10, wherein the processing unit is further configured to ascertain the first reference value by determining a mean of ascertained respective first values of all fuel injectors of the internal combustion engine except the one of the fuel injectors, wherein each of the first values is ascertained by determining a quotient of: (i) a pressure drop in the high-pressure accumulator during a fuel injection by the respective fuel injector, and (ii) a time duration of the fuel injection by the respective fuel injector.

12. A computer program that prompts a processing unit to carry out a method for diagnosing an error in an internal combustion engine in which fuel is injected from a high-pressure accumulator into associated combustion chambers with the aid of multiple fuel injectors, the method comprising:

ascertaining a first value that represents a static flow rate of fuel through one of the fuel injectors, the ascertaining of the first value including determining a quotient of: (i) a pressure drop in the high-pressure accumulator during a fuel injection by the one of the fuel injectors, and (ii) a time duration of the fuel injection by the one of the fuel injectors;

ascertaining a second value that represents a running smoothness of the internal combustion engine, the ascertaining of the second value including determining a rotational speed fluctuation of the internal combustion engine, wherein the rotational speed fluctuation of the internal combustion engine is a deviation of a maximally occurring rotational speed of the internal combustion engine from a mean value of the rotational speed of the internal combustion engine;

detect the error if: at least one of (1) the first value deviates from a first reference value, and (2) the second value deviates from a second reference value; and if the error is detected, determining the error is attributable to:
(1) the one of the fuel injectors if the first value deviates from the first reference value, and
(2) at least one further component of the internal combustion engine, or at least one operating phase of the internal combustion engine if the second value deviates from the the second reference value, and
(3) both (i) the one of the fuel injectors, and (ii) the at least one further component of the internal combustion engine or the at least one operating phase of the internal combustion engine, if both (i) the first value deviates from the first reference value, and (ii) the second value deviates from the second reference value.

13. A non-transitory machine-readable memory medium on which is stored a computer program for diagnosing an error in an internal combustion engine in which fuel is injected from a high-pressure accumulator into associated combustion chambers with the aid of multiple fuel injectors, the computer program, when executed by a processing unit, causing the processing unit to perform the following steps:

ascertaining a first value that represents a static flow rate of fuel through one of the fuel injectors, the ascertaining of the first value including determining a quotient of: (i) a pressure drop in the high-pressure accumulator during a fuel injection by the one of the fuel injectors, and (ii) a time duration of the fuel injection by the one of the fuel injectors;

ascertaining a second value that represents a running smoothness of the internal combustion engine, the ascertaining of the second value including determining a rotational speed fluctuation of the internal combustion engine, wherein the rotational speed fluctuation of the internal combustion engine is a deviation of a maximally occurring rotational speed of the internal combustion engine from a mean value of the rotational speed of the internal combustion engine;

detecting the error if: at least one of (1) the first value deviates from a first reference value, and (2) the second value deviates from a second reference value; and if the error is detected, determining the error is attributable to:
(1) the one of the fuel injectors if the first value deviates from the first reference value, and
(2) at least one further component of the internal combustion engine, or at least one operating phase of the internal combustion engine if the second value deviates from the the second reference value, and
(3) both (i) the one of the fuel injectors, and (ii) the at least one further component of the internal combustion engine or the at least one operating phase of the internal combustion engine, if both (i) the first value deviates from the first reference value, and (ii) the second value deviates from the second reference value.

14. The non-transitory machine-readable memory medium according to claim 13, wherein the computer program, when executed by the processing unit, further causes the processing unit to perform the following step:

ascertaining the first reference value by determining a mean of ascertained respective first values of all fuel injectors of the internal combustion engine except the one of the fuel injectors, wherein each of the first values is ascertained by determining a quotient of: (i) a pressure drop in the high-pressure accumulator during a fuel injection by the respective fuel injector, and (ii) a time duration of the fuel injection by the respective fuel injector.

* * * * *